Nov. 29, 1960 L. I. SCHIFF 2,961,767
DIFFERENTIAL ANALYZER

Filed Aug. 21, 1944 5 Sheets-Sheet 1

INVENTOR.
LEONARD I. SCHIFF
BY George Sipkin
B. L. Zangwill
ATTORNEYS

Nov. 29, 1960  L. I. SCHIFF  2,961,767
DIFFERENTIAL ANALYZER
Filed Aug. 21, 1944  5 Sheets-Sheet 2

INVENTOR.
LEONARD I. SCHIFF
BY George Sipkin
B. L. Zangwill
ATTORNEYS

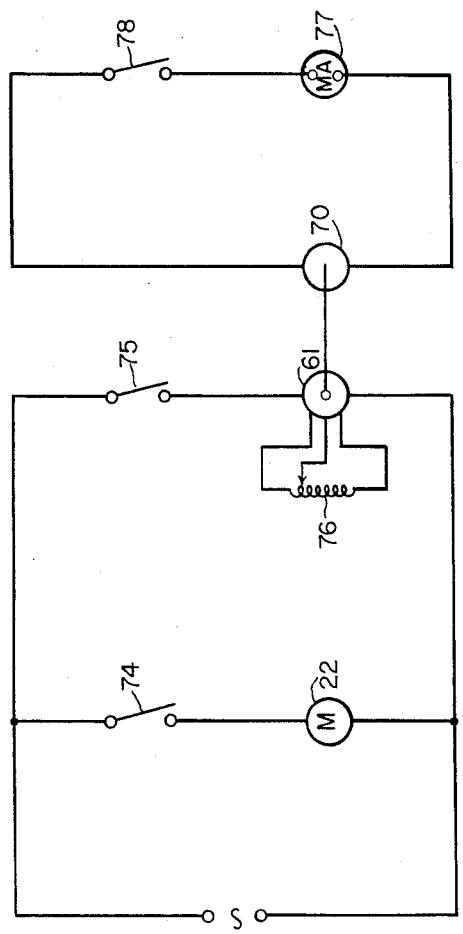

United States Patent Office 2,961,767
Patented Nov. 29, 1960

2,961,767

DIFFERENTIAL ANALYZER

Leonard I. Schiff, Philadelphia, Pa., assignor to the United States of America as represented by the Secretary of the Navy Filed Aug. 21, 1944, Ser. No. 550,470

9 Claims. (Cl. 33—1)

The present invention relates to a differential analyzer and more particularly to a mechanical device for solving differential equations of the general type $$F\left(\frac{dy}{dx}\right) = f(y) \tag{1}$$

This equation can, in theory, be solved for $dy/dx$ in the form $$\frac{dy}{dx} = G(y) \tag{2}$$

This step is often (and in the particular situation discussed below, is actually) a laborious and time consuming one if conventional methods of solution are used. The present invention provides a means for accomplishing this solution simply and rapidly, while another portion of the invention simultaneously integrates Equation 2.

There are in existence several types of differential analyzers which solve many kinds of differential equations. In general, however, these are very complex and delicate instruments and it is the purpose of the present invention to provide a simple machine which will easily solve equations of the type set out above. This is a common type of equation and is often encountered in the solution of practical problems. For example, it is well known that the path of a ray through a medium is determined by the manner in which the velocity of the ray changes as it progresses through it. Thus, where sound, radio or light rays are transmitted through a given medium (air, water, earth, etc.) in which the velocity of the ray varies as a function of only one coordinate, the present invention provides convenient means for plotting the path of the ray where the equation relating the velocity to such coordinate is known. Because the velocity varies as a function of only one coordinate, the equation is of the type $$F\left(\frac{dy}{dx}\right) = f(y)$$

Although the device is useful in the solution of any of the problems outlined above, the present disclosure will relate its use to the plotting of the path of high frequency sound waves in water. This is particularly desirable in echo-ranging and detection procedures in which it is desired to determine the limiting ranges which may be expected. It is to be clearly understood, however, that this is but one application of its usefulness and it is in no way intended to limit the use or function.

In the drawings:

Fig. 7 is a schematic diagram of the electrical elements used in conjunction with the form of the invention shown in Figs. 2, 3 and 4.

Figure 1:
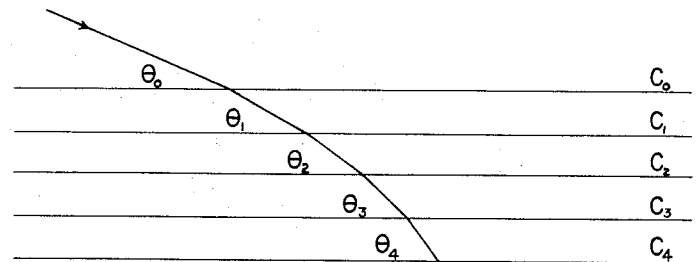
Fig. 1 is a schematic representation of the passage of a sound ray through water in which the velocity of the ray varies with depth.

The theoretical principle on which the operation of this device is based is illustrated schematically in Fig. 1. If the water is assumed to have a constant velocity for sound propagation in each of a number of thin layers, the ray is refracted at each interface in accordance with Snell's law:

$$\cos \theta_0/c_0 = \cos \theta_1/c_1 = \cos \theta_2/c_2 = \ldots \tag{3}$$

and the ray in each layer is a segment of a straight line; here, the angles $\theta$ are between the ray and the horizontal, and $c_0$, $c_1$, etc. are the velocities in the different layers. If now the layers are imagined to become thinner, a continuous velocity distribution is approached, and the ray becomes a smooth curve. However, at each point along the ray, the angle with the horizontal and the velocity of sound are still related by Equation 3:

$$\cos \theta/c = \cos \theta_0/c_0 \tag{4}$$

where $c_0$ may be taken to be the velocity of sound at the level of the source and $\theta_0$ the initial angle of the ray.

Equation 4 is an inconvenient one with which to work, since both the angles $\theta$ and the fractional variations in the velocity $c$ are quite small:

$$\begin{aligned}\theta &\ll 1 \text{ radian} \\ v &= c - c_0 \ll c_0\end{aligned} \tag{5}$$

Thus the horizontal range of the ray is so much greater than the vertical distance traversed by it that it is desirable to contract the horizontal scale with respect to the vertical for purposes of plotting. If this contraction is by a factor $\alpha$, the angle $\phi$ of the plotted ray with the horizontal is related to the angle $\theta$ of the actual ray with the horizontal by $$\tan \phi = \alpha \tan \theta \tag{6}$$

It should be noted that if the ray is plotted on the contracted scale mentioned above, so that $x$ and $y$ are cartesian coordinates of a point on the ray thus plotted, they are related to $\phi$ by the equation $$\frac{dy}{dx} = \tan \phi \tag{7}$$

Equation 4 can be written:

$$c(1 + \tan^2 \theta)^{1/2} = c_0(1 + \tan^2 \theta_0)^{1/2}$$

and this can be expanded out by the binomial theorem to give $$c(1 + \tfrac{1}{2} \tan^2 \theta) = c_0(1 + \tfrac{1}{2} \tan^2 \theta_0) \tag{8}$$

as an approximation, since according to the first part of Equation 5, the higher powers of $\tan^2 \theta$ can be neglected. Substitution of Equation 6 into 8 gives $$c(1 + \tan^2 \phi/2\alpha^2) = c_0(1 + \tan^2 \phi_0/2\alpha^2)$$

which may be written $$c_0 + v + (c_0/2\alpha^2) \tan^2 \phi + (v/2\alpha^2) \tan^2 \phi = c_0 + (c_0/2\alpha^2) \tan^2 \phi_0 \tag{9}$$

In Equation 9, the $c_0$ cancel, and the term involving both $v$ and $\tan^2 \phi$ is evidently smaller than the others, in view of Equation 5; therefore $$\tan^2 \phi = \tan^2 \phi_0 - 2\alpha^2 v/c_0 \tag{10}$$

Figure 6:
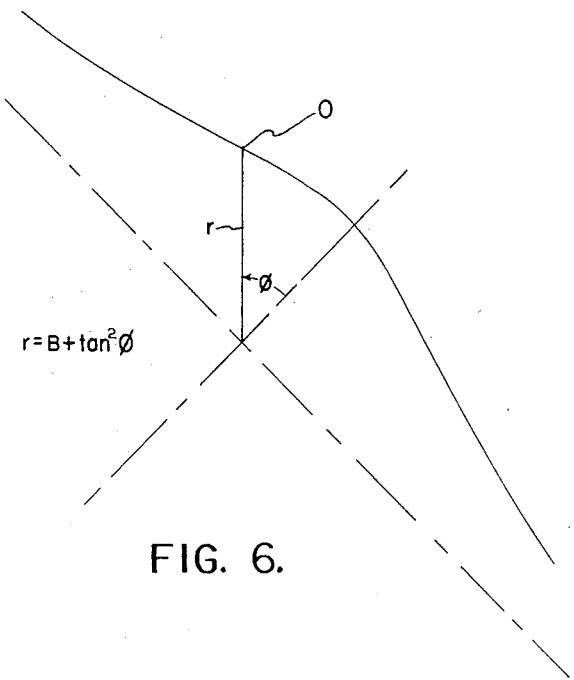
Fig. 6 is a polar plot of the equation, $r = \beta + \tan^2 \phi$.

For practical use, it is convenient to add a constant $\beta$ to both sides of Equation 10:

$$\beta + \tan^2 \phi = \beta + \tan^2 \phi_0 - 2\alpha^2 v/c_0 \qquad (11)$$

so that the two sides of Equation 11 never vanish and hence the curve of Fig. 6 does not pass through the origin and is accessible for all values of $\phi$. Referring to Equation 7, and remembering that $v$ is a function of $y$, Equation 11 may be written $$\beta + \left(\frac{dy}{dx}\right)^2 = A + Bv(y) \qquad (12)$$

where A and B are obvious abbreviations for constants. Parenthetically, it should be noted that Equation 12 is a particular case of Equation 1, with $$F\left(\frac{dy}{dx}\right) = \beta + \left(\frac{dy}{dx}\right)^2$$

and $$f(y) = A + Bv(y)$$

Equation 10 or 11 describes a ray which starts out from a source making a plotted angle $\phi_0$ with the horizontal. The ray can be plotted mechanically if means are available for developing the ray from its instantaneous slope and at the same time continuously adjusting this slope so that it is given by the above equation in terms of $v$, which is itself a function of $y$ (or depth). The present invention provides an arrangement for accomplishing these ends.

In brief, the invention consists of a power driven, sharp-edged wheel, mounted in a vertical plane and bearing on a horizontal surface. This surface contains two perpendicular axes, which represent the horizontal and vertical directions in the water; the horizontal scale is contracted by the factor $\alpha$ with respect to the vertical scale. Attached to the wheel is a horizontal disk whose orientation determines the angle $\phi$ between the plane of the wheel and the horizontal axis of the surface. This disk contains a transparent section on which is engraved a plot in polar coordinates $r$, $\phi$ of the function $r = \beta + \tan^2 \phi$ (or, more generally, $r = F(\tan \phi)$) (the left side of Equation 11 or 12), oriented so that the plane of the wheel is along the direction $\phi = 0$. Thus, if this disk can always be turned so that the radius $r$ along the horizontal direction is equal to a constant times $v$ (the right side of Equation 11 or 12), the wheel will always be pointed in the instantaneous direction of the ray. Thus far, that portion of the device has been described which solves Equation 12 for $dy/dx$, as mentioned more generally in the first paragraph hereof.

Apart from the wheel and disk, there is required a curve of minus $v$ (or, more generally, of $-f$) as abscissa against depth as ordinate, in suitable units, which will follow along with the horizontal motion of the wheel but remain fixed so far as vertical motion is concerned. The initial setting is then made by placing the point of contact of the wheel on the initial position, and the plane of the wheel in the initial direction desired for the ray. The $v$-depth curve is then translated horizontally until it, the curve engraved on the disk, and a horizontal fiducial line through the center of the disk, all intersect in a single point. This horizontal displacement of the $v$-depth curve corresponds to setting $v = 0$ at transducer depth on the right side of Equation 11, so that at this point $\phi = \phi_0$. If then the wheel is set into motion and the three-fold intersection maintained, the wheel is always oriented so that the radius $r$ along the horizontal direction of the disk curve (which equals the left side of Equation 11) is equal to the abscissa of the $v$-depth curve at that depth (which has now been adjusted by the initial horizontal displacement so that it equals the right side of Equation 11). Thus Equation 11 or 12 is always satisfied and rotation of the wheel generates the ray. That portion of the device which integrates Equation 2 has now been described.

Although the relative motions of the different parts of the device are as outlined above, it is more convenient in practice to have the axis of the disk fixed in space, and have the surface on which the wheel bears move underneath it. This last is readily accomplished by rolling this surface up into a cylinder whose axis is along the depth direction and whose circumference is along the horizontal. The cylinder is mounted so that it can rotate freely on bearings in a carriage which in turn is free to move along a track parallel to the axis of the cylinder. This carriage also supports the $v$-depth curve, so that this curve shares the depth motion of the carriage and cylinder relative to the wheel but does not move horizontally with respect to the wheel after it has been set initially. The horizontal fiducial line is then fixed in space.

Figure 2:
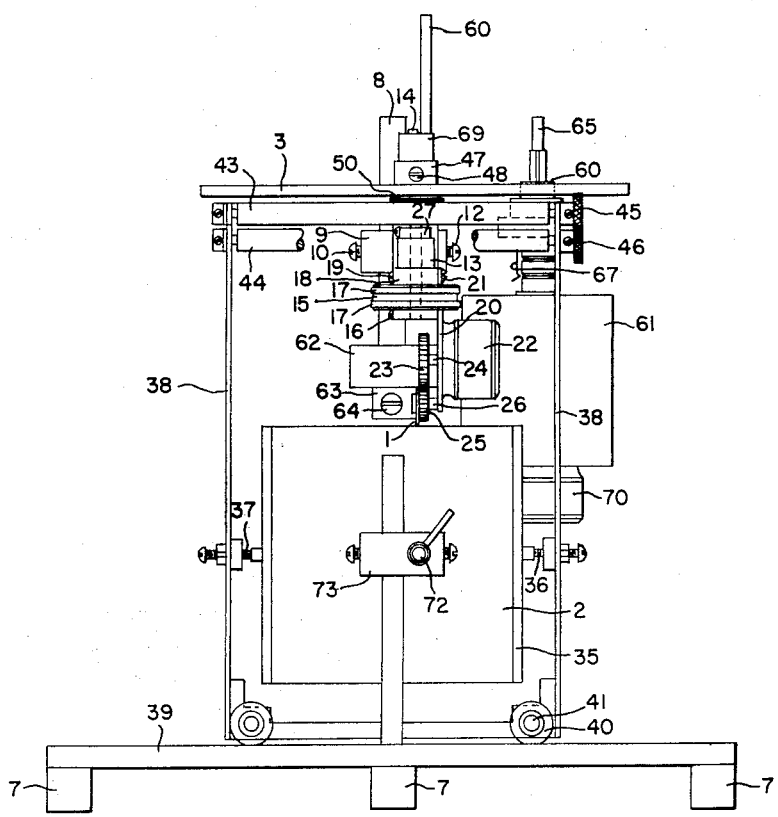
Fig. 2 is a front elevation of one form of the invention.
Figure 3:
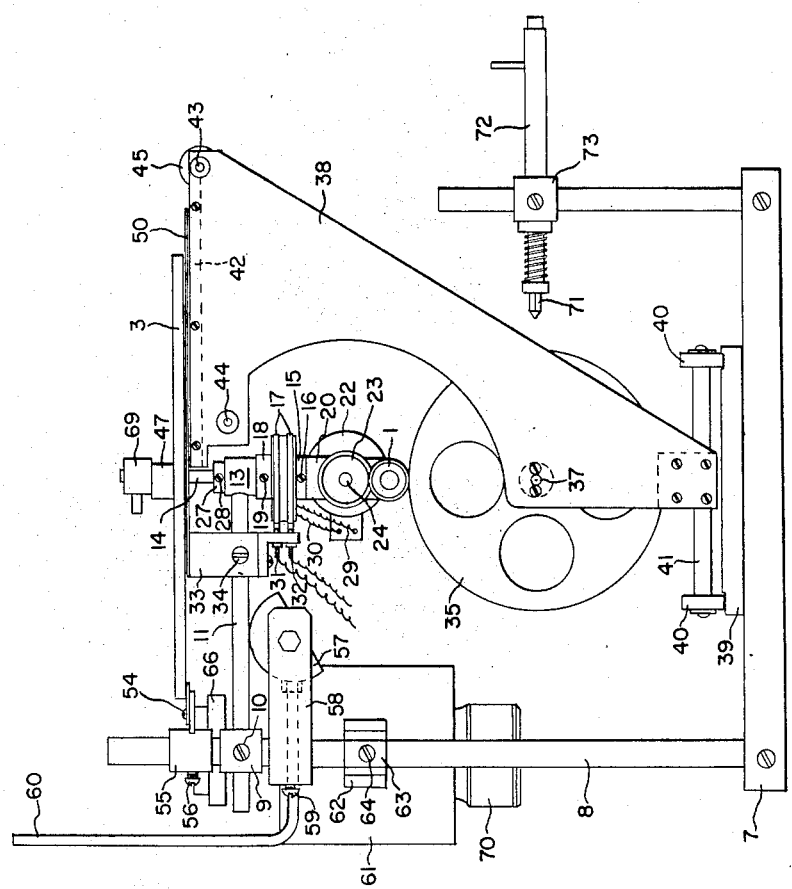
Fig. 3 is a side elevation of the form of the invention shown in Fig. 2.
Figure 4:
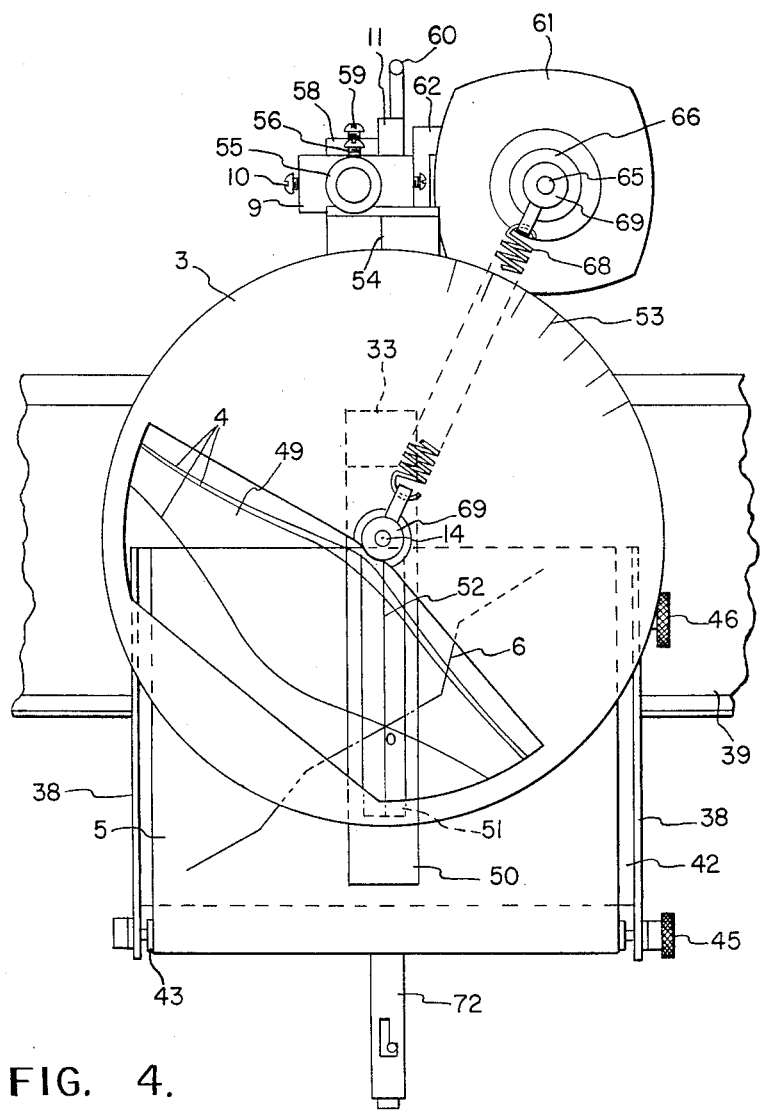
Fig. 4 is a plan view of the form of the invention shown in Fig. 2 with certain of the parts omitted for clarity. It should also be noted that the circular, horizontal plate has been partially rotated with respect to its driving shaft (as shown in Figs. 2 and 3) in order to illustrate the intersection of the various curves.

The device is shown in detail in Figs. 2, 3 and 4. The main elements, heretofore mentioned, are the sharp-edged, tracing wheel 1, a sheet of plotting paper 2 on which the ray is traced, the horizontal plotting disk 3 (marked with the polar curve 4), and the paper strip 5 (shown only in Fig. 4), on which is marked the $v$-depth curve 6.

The assembly supporting the wheel 1 is maintained by a framework comprising a base 7, and a vertical rod 8 secured in this base. This rod mounts a sliding collar 9, which may be secured at any level by a set-screw 10. A horizontal rod 11 is also slidably engaged by collar 9 and may be fixed in position by means of a similar set-screw 12. It carries a bearing 13 on its outer end, through which passes another vertical shaft 14. The disk 3 is keyed to this latter shaft at its upper end for rotation therewith. The lower end of the shaft supports a cylindrical non-conducting block 15 by means of set-screw 16, and this block mounts a pair of slip rings 17, 17. An additional collar 18 is keyed to the shaft 14 between bearing 13 and block 15 by means of a set-screw 19. A downwardly extending support member 20 is fixed to the block 15 by means of set-screw 21 and this member is arranged to mount a small clock motor 22 on its lower end. This motor may conveniently be a "Synchron," Model 600 (1 r.p.m.) and is arranged to drive a gear 23 by means of a shaft 24 extending through support 20, which gear in turn drives another gear 25. This latter gear is keyed to a small shaft 26, also mounted in support 20, and is fixed to rotate (at 10/7 r.p.m., in the arrangement shown) as a unit with wheel 1 (whose diameter, in the model shown, is .991 inch). The whole unit (including disk 3 and wheel 1) thus rotates about the axis of shaft 14 and is held against vertical motion by a small collar 27 designed to rest against bearing 13, secured to rod 14 by means of a set-screw 28. Suitable connections 29, 30 are provided between the motor 22 and the slip-rings 17, 17; and current is supplied to the slip rings through a pair of contacts 31, 32. These latter contacts are conventionally mounted on a bracket 33 slidably mounted on rod 11, which bracket may be secured in place by set-screw 34. The plotting paper 2 is wrapped about a cylindrical drum 35 which is mounted for rotation on a pair of bearings 36, 37. On this paper, depth is measured in a direction parallel to the axis of the cylinder and horizontal distance is measured around its circumference on a scale determined by the particular value of $\alpha$ chosen in Equation 4. These bearings are supported in a carriage 38. This carriage moves on a slotted track 39 by means of rollers 40 and axles 41 mounted in the carriage. The top of the carriage is provided with a flat plate 42 on which the paper 5, marked with the $v$-depth curve 6 is designed to rest. This curve is obtained, in practice from a conversion of a bathythermograph record which records the relationship of temperature and depth. On curve 6, depth is measured in the same direction and to the same scale as it is on paper 2 on drum 35. A pair of rollers 43, 44 are provided to roll the paper 5 back and forth over the plate 42 and under disk 3. Thus, the paper extends from roller 43, across and over the rounded end of plate 42, and onto roller 44. For convenience, a pair of knurled knobs 45, 46 are provided on the ends of the rollers to shift the position of paper 5. If desired, plate 42 may be made of some transparent material and a light source mounted underneath it in order that the curve 6 may be more easily read.

Disk 3 is keyed to shaft 14 at its upper extremity and made rotatable therewith by means of a collar 47, formed integrally therewith, and a set-screw 48. The disk is provided with a transparent insert 49, which may conveniently be of Plexiglas, on which are drawn the polar curves 4, as best shown in Fig. 4. As has been described, these are polar plots of the function, $\beta + \tan^2 \phi$, with the center of shaft 14 at the origin and are so arranged in conjunction with wheel 1 that the wheel is oriented for travel in the direction $\phi = 0$. Three separate curves are shown and these differ in that various values (1, 2, 6) have been given to $\beta$. For convenience, a scale of $\frac{1}{2}'' = 1$ unit may be used.

Just under disk 3 and above paper 5 is a metal strip 50 which is fixed in position by attachment to collar 33 on shaft 11. The strip is provided with a transparent window 51 on which is drawn a straight fiducial line 52 in a direction perpendicular to the axis of drum 35. Thus, looking at the top of the machine, as in Fig. 4, it is possible to see the polar plot 4, the fiducial line 52 and the $v$-depth curve 6 on paper 5. In order that the initial position of disk 3 may be established, an angular scale 53 is marked on its edge opposite the insert, which scale may be read against a small indicator 54 supported by a collar 55 on rod 8, as shown in Fig. 3. Its position may be fixed by means of a set-screw 56.

Since, in operation, tracing wheel 1 frictionally engages the paper 2 wrapped on drum 35, a cam 57, mounted by means of a support 58 and set-screw 59, is fixed to rod 8 for lifting the wheel 1 and its associated assembly from the paper. The cam is operated by means of a lever 60 and is simply arranged to engage horizontal rod 11 whereby it slightly lifts the wheel assembly.

The disk 3 is arranged to be driven by a motor 61 (which conveniently may be a Barber Colman, pYAz4299) mounted by means of a bracket 62 (supported for rotation on shaft 8) and held in position by collar 63 and set-screw 64. The shaft 65 driven by the motor is provided with a set of friction drive pulleys 66 of different diameters which may be shifted along the shaft and fixed in position by means of clamps 67. The pulleys are held in contact with the edge of disk 3 by means of a spring 68 which is provided with ball-bearing rings 69, 69 at its ends. These are designed to be slipped over the end of the motor drive shaft 65 and shaft 14, as shown in Fig. 4. In that figure, however, the pulleys are shown out of contact with the disk for convenience of illustration.

It is also convenient to attach a small generator 70, which may be a motor of the same type as motor 22, to the lower end of drive shaft 65, which, when thus operated, supplies current whose magnitude is found to vary substantially linearly with speed.

An additional feature of the machine is the use of a pencil or other marking device 71 to draw the path of the ray on paper 2. This marker is fixedly mounted by means of a spring holder 72 supported in a collar 73. This collar is in turn keyed to a shaft extending out of the base 7. Since the paper 2 on drum 35 is limited to motion of rotation and longitudinal motion along track 39, the point of the marker will trace the same curve as made by wheel 1.

The electrical circuits associated with the various motors are shown schematically in Fig. 7. Motors 22, 61 are seen to be connected to a convenient source of A.C. through separate switches 74, 75, respectively. Motor 61 is conventionally controlled by means of a Variac 76 in order that it may be driven at variable speeds (and reversed) in any manner necessary to properly control the rotation of disk 3. Motor 61 is shown to be mechanically coupled to generator 70, the output of which is applied to the terminals of a microammeter 77 in order that the speed of motor 61 may be determined, as described above. A switch 78 is included in this output circuit to protect the meter. These various components may be mounted in conjunction with the device in any convenient manner.

Figure 5:
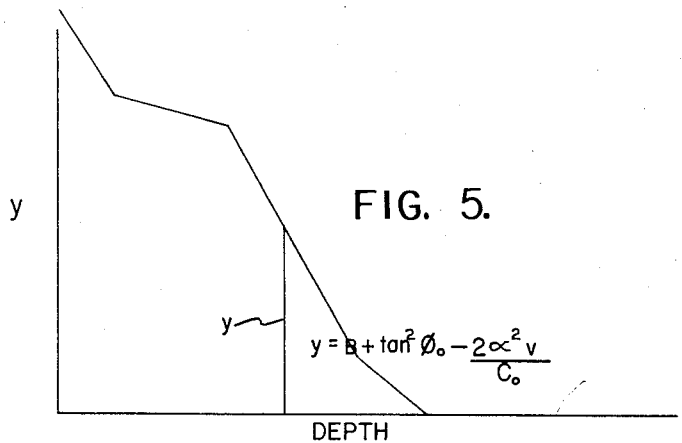
Fig. 5 is a curve showing the relationship between depth of water and the variation in the velocity of sound, as defined herein.

Returning to a consideration of Equation 11, it is noted that it expresses an equality in terms of the angle $\phi$ and the variation in velocity $v$. It is the purpose of the device to mechanically equate the two sides of this equation in order that the instantaneous values of $\phi$ are determined, as $v$ changes. To understand this, Figs. 5 and 6 show the plots of the two sides of the equation as follows:

$$y = \beta + \tan^2 \phi_0 - \frac{2\alpha^2 v}{c_0} \qquad (13)$$

$$r = \beta + \tan^2 \phi \qquad (14)$$

The second of the above equations (the left side of Equation 11) is shown in Fig. 6 and is seen to be plotted on the insert 49 in disk 3 with its origin at the center of the disk. The graph of the first of these equations (the right side of Equation 11) is shown in Fig. 5, and is the $v$-depth curve 6 on the roll of paper 5 (see Fig. 4). The fiducial line 52 serves to orient the superposition of the two curves. Since the values $y$ and $r$ are to be set equal, the fiducial line serves to measure $y$ on the $v$-depth curve 6 and $r$ on the polar curve 4, simultaneously.

In the general case, it will be desired to trace the path of a ray which is initially at an angle $\theta_0$ with the horizontal. The scale 53 is calibrated in terms of $\theta$ (and not $\phi$), and thus the disk 3 and curve 4 are rotated until the initial angle $\theta_0$ is indicated on that scale. At this position, the fiducial line 52 makes an angle $\phi_0$ with the axis of polar curve 4, and it is to be noted that because the scale is calibrated in terms of $\theta$, it is not uniform with respect to $\phi$. The $v$-depth curve 6 on paper 5 is then shifted so that the fiducial line 52 is set at the initial depth on the curve 6 (shown in Fig. 5) and so that curve 6, curve 4 and the fiducial line 52 intersect at the same point 0. Since the direction of travel of the wheel 1 is also the direction of the axis of the curve 4 (i.e., $\phi = 0$), the wheel 1 will begin to roll in a direction $\phi_0$ with the horizontal when motor 22 is started by means of switch 74. As it rolls, it will force the drum 35 and paper 2 to rotate on bearings 36, 37 and to cause the carriage supporting the drum to roll horizontally. Since the carriage also supports curve 6, and in order to maintain the intersection between curve 6, curve 4 and fiducial line 52, it is necessary to rotate disk 3 and curve 4. Rotation of the disk 3, in turn, give the new direction to wheel 1 for the new depth, said rotation being great or small depending upon the slope of the $v$-depth curve 6. Since the paper 2 on drum 35 is calibrated in terms of depth vs. horizontal distance and since the wheel 1 is always rotating in a direction at an angle $\phi$ to the horizontal (the slope of the path of the ray at that point), the curve traced by wheel 1 on paper 2 is the actual path of the ray.

It is obvious that the above procedure gives only the path of one individual ray, while it may be desired to study the family of rays diverging from the same initial point, but each starting with a different initial angle $\theta$. However, it is found in practice that if approximately 15–20 such individual rays are traced, a sufficiently complete picture of the family is obtained. In such case the spacing of the initial ray directions should be about 0.1° in the water at small angles, and 0.2° to 0.4° at larger angles.

If, after the ray paths have been drawn, it is desired to plot the contours of equal sound intensity (isoenergic lines), these may be determined by finding a set of points at which the product of the vertical separation of two rays of given initial angular separation and the horizontal distance from the transducer has a particular value. The entire plotting procedure (including the determination of the isoenergic lines) may be completed in from 3–4 hours instead of the several days which would be required to produce the same curves graphically.

In practice, much smoother operation is obtained by adjusting the angular velocity of the disk 3 than by adjusting its angular position. This is accomplished by driving the disk at its edge by the pulleys 66. A further advantage in using the angular velocity control follows from the fact that for small ray angle $\phi$, where visual tracking is most difficult, the angular velocity of the disk is proportional to the velocity gradient. To see this, substitute $\phi$ for tan $\phi$ in Equation 11, as is justified for small angles, and differentiate with respect to the horizontal coordinate $x$. This gives $$\phi(d\phi/dx) = -(\alpha^2/c_0)(dv/dx) \tag{15}$$

Dividing the left side of Equation 15 by $\phi$ and the right side by the approximately equal quantity $dy/dx$, where $y$ is the depth coordinate, gives $$d\phi/dx = -(\alpha^2/c_0)(dv/dy) \tag{16}$$

The left side of Equation 16 is the curvature of the ray; for constant wheel speed and small angles it is proportional to the angular velocity of the disk.

To take advantage of this result, the motor 61 is driven at variable speed (and can be reversed) by means of conventional Variac 76, and the speedometer (generator 70 and milliammeter 77) attached to it is calibrated in feet/second of velocity gradient. Thus, knowledge of the velocity gradient makes it possible to track the ray automatically so long as the angle $\phi$ is small, and this is the only case in which visual tracking is difficult. The speed can be easily controlled for a large range of velocity gradients including the isothermal case, where the relatively small velocity gradient is due only to pressure. At larger angles, normal procedure involves use of the Variac 76 for speed control in visual tracking without explicit reference to the velocity gradient indicator.

It is obvious that the integral curve traced (or drawn) on the paper 2 on drum 35 allows the determination of the depth of the ray for any horizontal distance from the initial point (or vice versa).

From what has been said, it can be seen that the device may easily be designed to determine the integral curve for any equation of the type of Equation 1. For this purpose, the curve on disk 3 is constructed according to the equation $$r = F(\tan \phi) \tag{17}$$

and the curve on paper 5 according to the equation $$x = f(y) \tag{18}$$

$x$ being the abscissa and $y$ the ordinate.

To illustrate these matters further, two other important special cases will be discussed. The first is that of the equation $$\frac{dy}{dx} = f(y) \tag{19}$$

In this case, Equation 17 is simply $$r = \tan \phi$$

while Equation 18 is $$x = f(y)$$

However, for convenience in obtaining smooth operation of the invention, it may be desirable to add a constant $\beta$ to both sides of Equation 19, whereupon Equation 17 becomes $$r = \beta + \tan \phi$$

and Equation 18 becomes $$y = \beta + f$$

The second important case is that of evaluating an integral of the form $$x = \int_a^y g(y) dy \tag{20}$$

which is clearly the equivalent of the differential equation $$\frac{dy}{dx} = 1/g(y)$$

together with the initial condition, $y = a$, when $x = 0$. Consequently, this integral can be evaluated by the invention; for this purpose, Equation 17 is simply $$r = \tan \theta$$

and Equation 18 is $$y = 1/g$$

Having described my invention, I claim:

1. In an integrating machine of the class described for solving differential equations, a rotatable plate carried on a fixed support, a carriage movable linearly on said support in a direction perpendicular to the axis of plate rotation and carrying a first chart substantially parallel to said plate, equation curves provided on said plate and said chart to be oriented for purposes of integration, said plate and first chart being viewable for relative alignment of said equation curves, a fixed member on said support having a fiducial line thereon which is operative to provide an indication of the relative orientation of said equation curves to assist in the integration, a second recording chart movably mounted on said carriage, drive means operatively connected to said plate and engaging said recording chart for moving said recording chart with respect to said carriage and for linearly moving said carriage.

2. In the machine defined in claim 1 said drive means comprising a mechanism mounted for unity angular rotation with said plate and including a rotary element driven at a slow constant speed and frictionally engaging said recording chart.

3. In an apparatus as defined in claim 1 but further including a driving means engaging said plate and operable to rotate same, a variable speed electric motor connected to said driving means, and a manually operable control device for varying the speed of said motor.

4. In the combination defined in claim 1, the curve-carrying portion of said plate being transparent, said fixed chamber comprising a device arranged between said plate and the first chart and likewise transparent, whereby, when the plate is properly rotated the curves and fiducial line are visually observable to permit ready angular adjustment of said plate.

5. A differential analyzer for solving equations of the type $$F\left(\frac{dy}{dx}\right) = f(y)$$

comprising: a rotatable plate mounted on a support member, a reference means, means carried by said plate and cooperating with said reference means for partially indicating the orientation of the plate by the function F; a chart member having a plot thereon positioned adjacent said plate and cooperating with said reference means for completing the indication of the orientation of said plate by the function $f$; a cylindrical surface mounted with its axis parallel to the plane of said plate for rotation about said axis, means supporting said surface and said chart member for translation in a direction parallel to said axis; drive means carried by said plate support member and engaging said surface for moving said surface in rotation and translation at relative rates determined by the instantaneous position of said plate with respect to said reference means and means inscribing a curve on said surface during movement thereof.

6. A device according to claim 5 wherein said drive means for moving said surface comprises a sharp-edged wheel adapted and arranged to frictionally engage and drive said surface.

7. A differential analyzer for solving equations of the type $$F\left(\frac{dy}{dx}\right)=f(y)$$

comprising; a rotatable plate having a polar plot of the equation $r=F(\tan \phi)$ outlined thereon in terms of $r$ and $\phi$, a supporting member carrying a chart having a cartesian plot of the equation $x=f(y)$ outlined thereon, means for rotatably supporting said plate, said supporting member being mounted in a plane parallel and adjacent to the plane of the rotatable plate with the means for supporting said plate functioning as the origin of said polar plot, a fixed member carried on said means for supporting said plate and having a fiducial line outlined thereon which extends outwardly from said origin and in a direction parallel to the x-axis of said cartesian plot, a cylindrical surface rotatably mounted on an axis extending parallel to the plane of said plate, movable means supporting said supporting member and said surface for translation in a direction parallel to said axis, a drive mechanism carried on said means for supporting the plate, said drive mechanism including means engaging said surface for moving said surface in rotation and translation at relative rates determined by the instantaneous position of said plate with respect to said supporting and fixed members, and marking means engaging said surface and operative to record the motion of said surface.

8. In an apparatus as defined in claim 7 but further characterized by said means engaging the surface comprising a sharp-edged wheel arranged to frictionally engage said surface.

9. In an apparatus as defined in claim 8 but further characterized by said drive mechanism comprising an electric motor carried on said means for supporting said plate, gear means connected to said motor and operative to drive said sharp-edged wheel, said gear means being operative to provide a predetermined speed reduction, and means for energizing said motor.

References Cited in the file of this patent

UNITED STATES PATENTS

| | | |
|---|---|---|
| 565,695 | Smith et al. | Aug. 11, 1896 |
| 1,380,754 | Bogaert | June 7, 1921 |
| 1,401,242 | Lavaud | Dec. 27, 1921 |
| 2,397,467 | Bush et al. | Apr. 2, 1946 |

FOREIGN PATENTS

| | | |
|---|---|---|
| 30,022 | France | Jan. 23, 1926 |
| | (Addition to No. 579,205) | |
| 298,173 | Great Britain | Sept. 24, 1928 |
| 580,025 | Germany | July 10, 1933 |